(12) United States Patent
Kang et al.

(10) Patent No.: US 12,380,008 B2
(45) Date of Patent: Aug. 5, 2025

(54) MEMORY TEST DRIVE

(71) Applicant: SAMSUNG ELECTRONICS CO., LTD., Suwon-si (KR)

(72) Inventors: U Kang, Seoul (KR); Su Hyun Chae, Suwon-si (KR); Jong Min Park, Suwon-si (KR); Jun-Gi Jang, Seoul (KR); Ji Yong Lee, Suwon-si (KR); Sooyeon Shim, Seoul (KR); Vladimir Vladimirovich Egay, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 18/301,842

(22) Filed: Apr. 17, 2023

(65) Prior Publication Data

US 2023/0401133 A1 Dec. 14, 2023

(30) Foreign Application Priority Data

Jun. 13, 2022 (KR) .................. 10-2022-0071200

(51) Int. Cl.
*G06F 11/273* (2006.01)
(52) U.S. Cl.
CPC ................ *G06F 11/2733* (2013.01)
(58) Field of Classification Search
CPC .................................. G06F 11/2733
USPC ........................................ 714/719
See application file for complete search history.

(56) References Cited

U.S. PATENT DOCUMENTS

| | | | |
|---|---|---|---|
| 6,033,076 A | 3/2000 | Braeuning et al. | |
| 7,308,133 B2 | 12/2007 | Gutta et al. | |
| 7,492,943 B2 | 2/2009 | Li et al. | |
| 8,538,139 B2* | 9/2013 | Kameyama | G06T 3/4053 382/254 |
| 9,798,956 B2* | 10/2017 | Jiang | G06V 10/776 |
| 10,133,988 B2 | 11/2018 | Ribeiro Mendes Junior et al. | |
| 10,832,096 B2 | 11/2020 | Karlinsky et al. | |
| 2002/0099536 A1* | 7/2002 | Bordner | G06F 40/284 704/10 |

(Continued)

FOREIGN PATENT DOCUMENTS

| | | |
|---|---|---|
| KR | 10-2008-0088778 | 10/2008 |
| KR | 10-2013-0046375 | 5/2013 |

(Continued)

OTHER PUBLICATIONS

Dan Hendrycks et al., "A Baseline For Detecting Misclassified And Out-Of-Distribution Examples in Neural Networks", Published as a conference paper at International Conference on Learning Representations (ICLR) 2017.

(Continued)

*Primary Examiner* — Albert Decady
*Assistant Examiner* — Osman M Alshack
(74) *Attorney, Agent, or Firm* — MORGAN, LEWIS & BOCKIUS LLP

(57) ABSTRACT

A memory test device is provided including a command feature vector extractor and an address feature vector extractor. The command feature vector extractor extracts a command feature vector, based commands executed on memory cells among a plurality of memory cells. The address feature vector extractor extracts an address feature vector, based on address-related information indicating locations of the memory cells executing the commands.

20 Claims, 9 Drawing Sheets

(56) References Cited

U.S. PATENT DOCUMENTS

| | | | |
|---|---|---|---|
| 2017/0091302 A1 | 3/2017 | Moser et al. | |
| 2018/0314617 A1* | 11/2018 | Khosrowpour | G06F 11/3409 |
| 2019/0007434 A1* | 1/2019 | McLane | G06N 3/045 |
| 2019/0361628 A1* | 11/2019 | Yaromenka | G06F 12/0246 |
| 2020/0250309 A1* | 8/2020 | Harang | G06F 18/21 |
| 2020/0412757 A1* | 12/2020 | Siddiq | H04L 63/20 |
| 2021/0166705 A1* | 6/2021 | Chang | G10L 19/038 |
| 2021/0382902 A1* | 12/2021 | Luo | G06F 16/285 |
| 2021/0383887 A1* | 12/2021 | Berman | G11C 11/54 |
| 2022/0189537 A1* | 6/2022 | Kim | G06F 3/0644 |
| 2023/0101817 A1* | 3/2023 | Sinha | G06F 16/93 |
| | | | 707/722 |

FOREIGN PATENT DOCUMENTS

| | | |
|---|---|---|
| KR | 10-2013-0104732 | 9/2013 |
| KR | 10-2019-0112414 | 10/2019 |
| KR | 10-2021-0103069 | 8/2021 |
| KR | 10-2022-0058127 | 5/2022 |

OTHER PUBLICATIONS

Wayne Ellis, et al., "Dram Operating States and Burn In", IEEE International Integrated Reliability Workshop Final, 2012.
Mehadi Hassen, et al., "Learning a Neural-network-based Representation for Open Set Recognition", SIAM, Feb. 12, 2018.
Martin Dimitrov et al., "Memory System Characterization of Big Data Workloads", 2013 IEEE International Conference on Big Data.
Abhijit Bendale, et al., "Towards Open Set Deep Networks", IEEE Computer Society, Nov. 19, 2015.

* cited by examiner

230

MC 1

Seq_WL (S1)

|      | CMD   | Rank | Bank Group | Bank | Address |
|------|-------|------|------------|------|---------|
| MC 1 | ACT   | 0    | 0          | 0    | 2       |
| MC 2 | WRITE | 0    | 0          | 1    | 1       |
| ⋮    | ⋮     | ⋮    | ⋮          | ⋮    | ⋮       |

MEMORY TEST DRIVE

CROSS-REFERENCE TO RELATED APPLICATION

This U.S. patent application claims priority under 35 U.S.C. 119 to Korean Patent Application No. 10-2022-0071200 filed on Jun. 13, 2022 in the Korean Intellectual Property Office, the disclosure of which is incorporated by reference in its entirety herein.

1. TECHNICAL FIELD

The present invention relates to a memory test device.

2. DISCUSSION OF RELATED ART

A mounting test can perform one or more tests on a memory device while the memory device is mounted on a main board or a memory board. However, some patterns of operation on the memory device may cause failures of the memory device. Further, these patterns of operation may differ among memory devices. It may be possible to improve the reliability of a memory device if these patterns can be avoided. However, presently it is difficult to determine these patterns.

SUMMARY

At least one embodiment of the present invention provides a memory test device having improved memory test reliability.

According to an embodiment of the present inventive concept, there is provided a memory test device including a command feature vector extractor and an address feature vector. The command feature vector extractor extracts a command feature vector, based on the commands executed on memory cells among a plurality of memory cells. The address feature vector extractor extracts an address feature vector, based on address-related information indicating locations of the memory cells executing the commands. Patterns of operation on a memory device may cause a failure or defect may be determined using the command feature vector extractor and the address feature vector.

According to an embodiment of the present inventive concept, there is provided a memory test device including, a class detector that divides workloads of a plurality of memory cells into a known workload and an unknown workload, based on a feature vector generated from a workload sequence of the plurality of memory cells. The workload sequence includes commands executed on memory cells among the plurality of memory cells and address-related information indicating locations of the memory cells executing the commands.

According to an embodiment of the present inventive concept, there is provided a memory test device including, a feature vector extractor that includes a command feature vector extractor configured to extract a command feature vector based on commands executed by memory cells among a plurality of memory cells, and an address feature vector extractor configured to extract an address feature vector based on address-related information of the memory cells accessed by the commands, and a class detector that classifies workloads of the memory cells into a known workload and an unknown workload, based on a feature vector including the command feature vector and the address feature vector.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
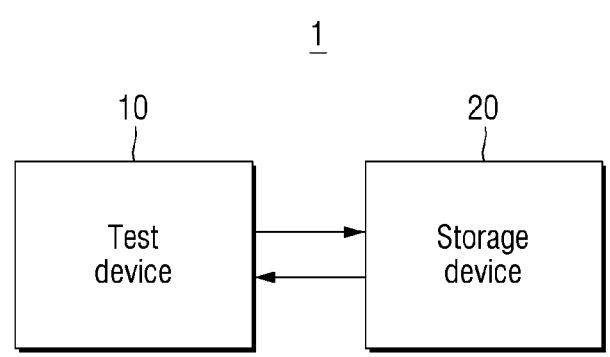
FIG. 1 is a block diagram showing a memory test system including a memory test device according to an exemplary embodiment of the inventive concept.

Components described referring to terms such as a part, a unit, a module, a block, -or, and -er used in the detailed description and functional blocks shown in the drawings may be implemented in the form of software or hardware or combinations thereof. As an example, the software may be a machine code, a firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or combinations thereof.

FIG. 1 is a block diagram showing a memory test system including a memory test device according to an embodiment of the inventive concept.

Referring to FIG. 1, a memory test system 1 includes a memory test device 10 and a storage device 20.

The memory test device 10 may detect defects of the memory device inside the storage device 20. Hereinafter, the memory device will be described as being included in the memory device 20 tested by the memory test device 10. More specifically, the memory test device 10 may detect defective memory cells inside the memory device.

The memory test device 10 may perform test operations for detecting defects of the memory device. For example, the memory test device 10 may perform a test operation for distinguishing whether the memory device successfully performs various operations (e.g., write or read operations, etc.).

The memory device may be a memory device that includes a volatile memory cell. For example, the memory device may be a memory device made up of a DRAM.

The memory test device 10 may secure in advance patterns (e.g., workloads) that cause failures in the memory device to test the memory device.

The memory test device 10 needs to distinguish whether a pattern causing a failure in the memory device is a known pattern or an unknown pattern. That is, when the memory test device 10 determines that a pattern causing a defect in the memory device is an unknown pattern, it is necessary to classify the pattern as a new pattern. As a result, it is possible to enhance the test coverage performed when the memory test device 10 tests the memory device.

A specific configuration and operation of the memory test device 10 will be described in detail below.

Figure 2:
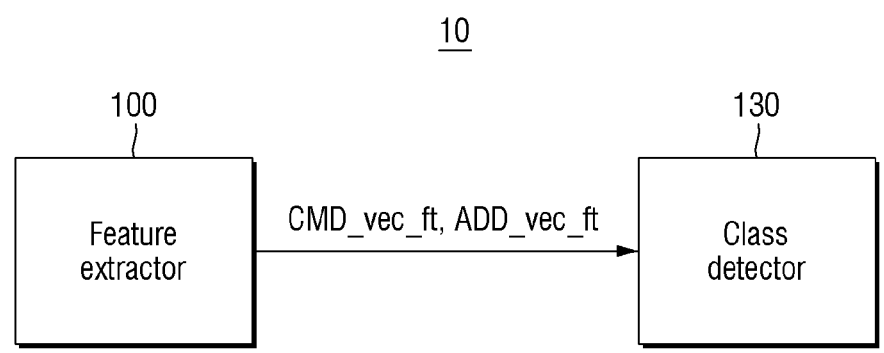
FIG. 2 is a block diagram showing a memory test device according to an exemplary embodiment of the inventive concept.

FIG. 2 is a block diagram showing a memory test device according to an exemplary embodiment of the inventive concept.

Referring to FIG. 2, a memory test device 10 according to an embodiment includes a feature vector extractor 100 and a class detector 130. In an embodiment, the feature vector extractor 100 is implemented by a first logic circuit and the class detector 130 is implemented by a second logic circuit. In an embodiment, the memory test device 10 includes a processor, the feature vector extractor 100 is a first computer program, the class detector 130 is a second computer program, and the processor is configured to execute the first and second computer programs. In an embodiment, the memory test device 10 includes the processor, and one of the feature vector extractor 100 and the class detector 130 is implemented by a logic circuit and the other is implemented by a program executed by the processor.

A workload for memory cells in a memory device of the storage device 20 is determined. The feature vector extractor 100 generates feature vectors (CMD_vec_ft and ADD_vec_ft) based on the workload, and sends the feature vectors (CMD_vec_ft and ADD_vec_ft) to the class detector 130.

The class detector 130 detects and distinguishes classes for the workload of the memory device, based on the feature vectors (CMD_vec_ft and ADD_vec_ft) received from the feature vector extractor 100.

More specifically, the class detector 130 may determine whether to distinguish the workload of the memory device into a known class or an unknown class.

The configuration and operation of the memory test device according to an exemplary embodiment of the inventive concept will be described in detail below.

Figure 3:
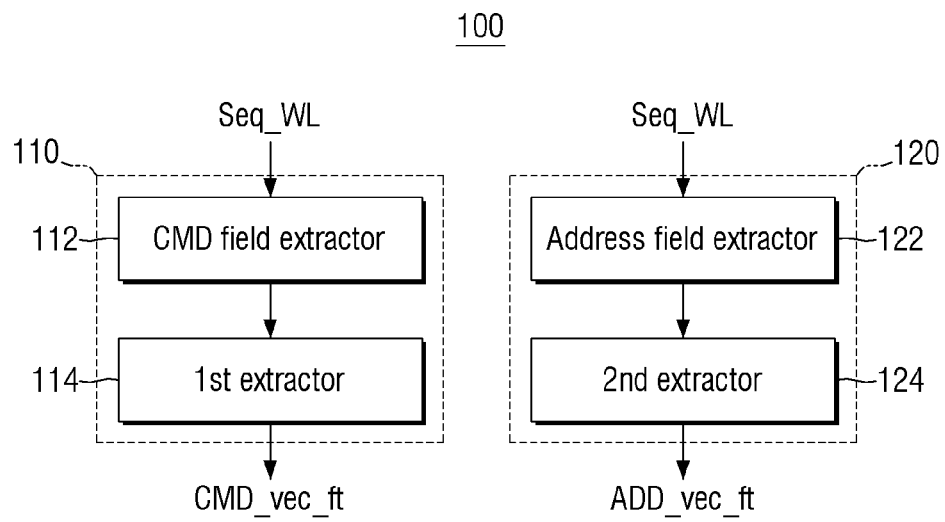
FIG. 3 is a block diagram showing a feature vector extractor of the memory test device according to an exemplary embodiment of the inventive concept.

FIG. 3 is a block diagram showing the feature vector extractor of the memory test device according to an exemplary embodiment of the inventive concept.

Referring to FIG. 3, the feature vector extractor 100 includes a command feature vector extractor 110 and an address feature vector extractor 120.

The command feature vector extractor 110 includes a command field extractor 112 (e.g., a logic circuit or a program) and a first extractor 114 (e.g., a logic circuit or a program).

The command feature vector extractor 110 extracts a command feature vector (CMD_vec_ft) on the basis of commands for each of a plurality of memory cells executed on the memory device to be tested by the memory test device 10.

The operation of the command feature vector extractor 110 will now be described in detail.

The command field extractor 112 extracts commands for each of a plurality of memory cells executed on the memory device to be tested by the memory test device 10. Also, the first extractor 114 extracts the command feature vector (CMD_vec_ft) on the basis of the command extracted through the command field extractor 112.

The operation of the command feature vector extractor 110 will be described together with FIGS. 4 to 8 below.

Figure 4:
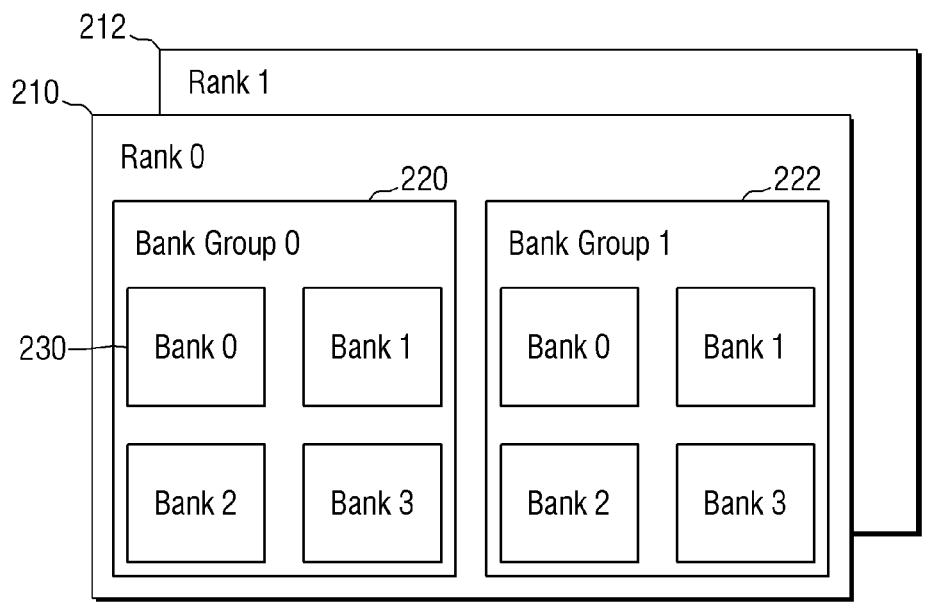
FIG. 4 is an exemplary block diagram for explaining a memory device.
Figures 5, 6:
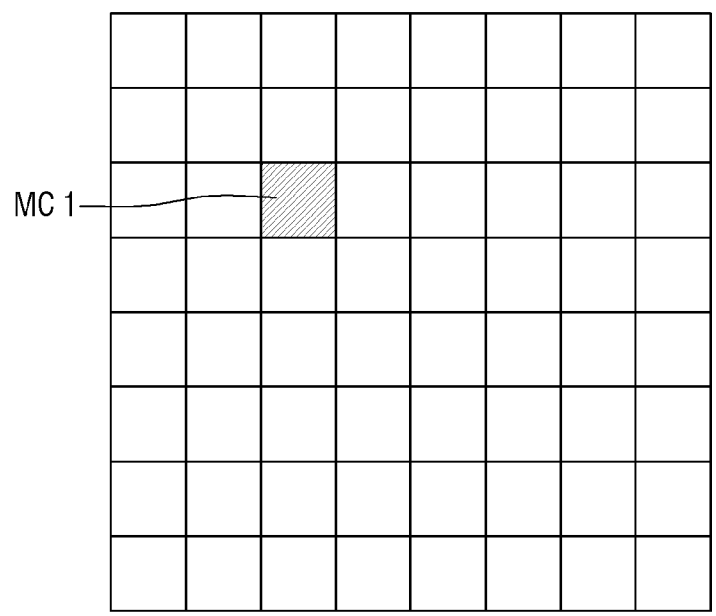
FIG. 5 is an exemplary diagram for explaining banks of the memory device.
FIG. 6 is an exemplary table for describing a workload sequence.
Figure 7:
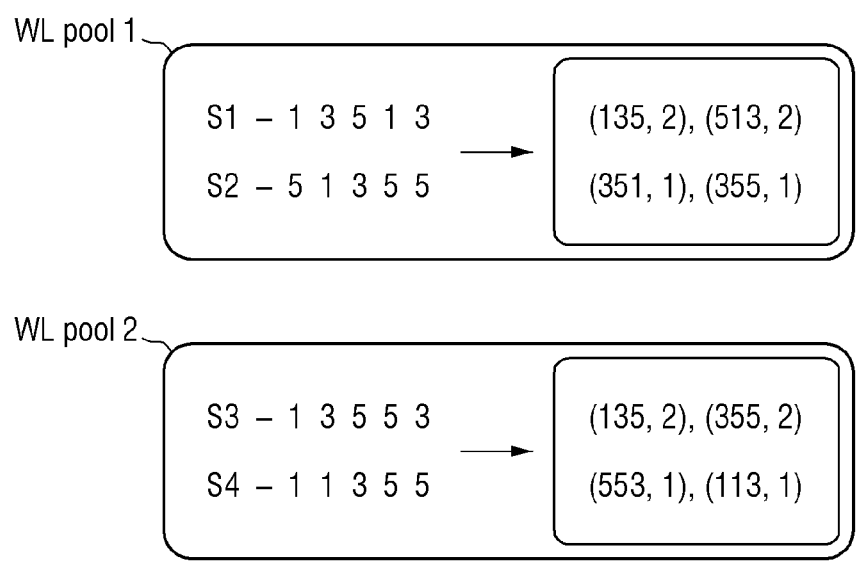
FIGS. 7 and 8 are diagrams for explaining an operation of the command feature vector extractor.
Figure 8:
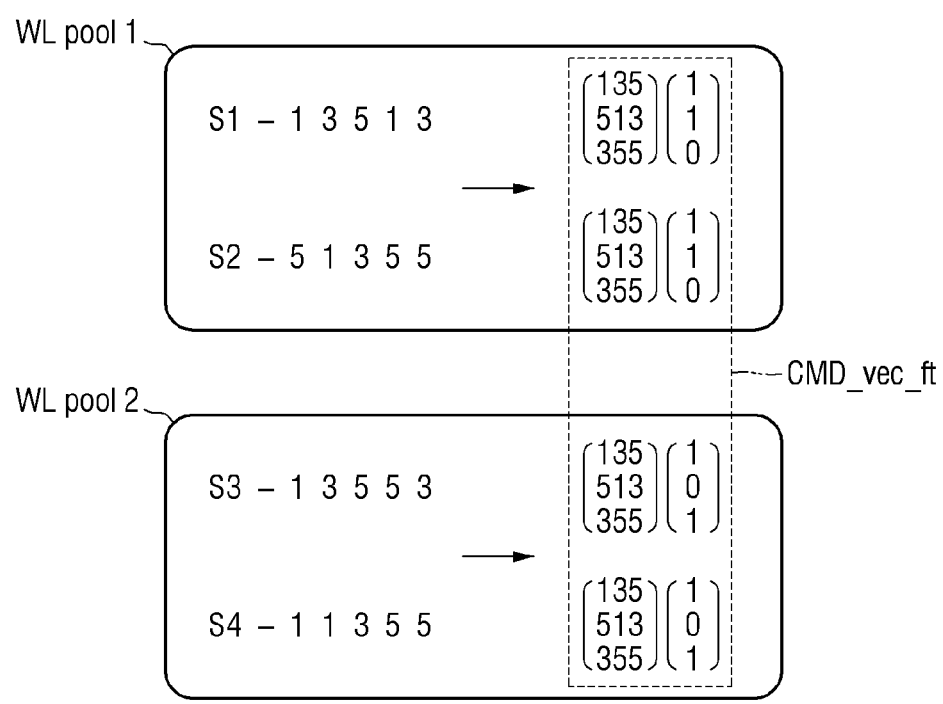
Figure 9:
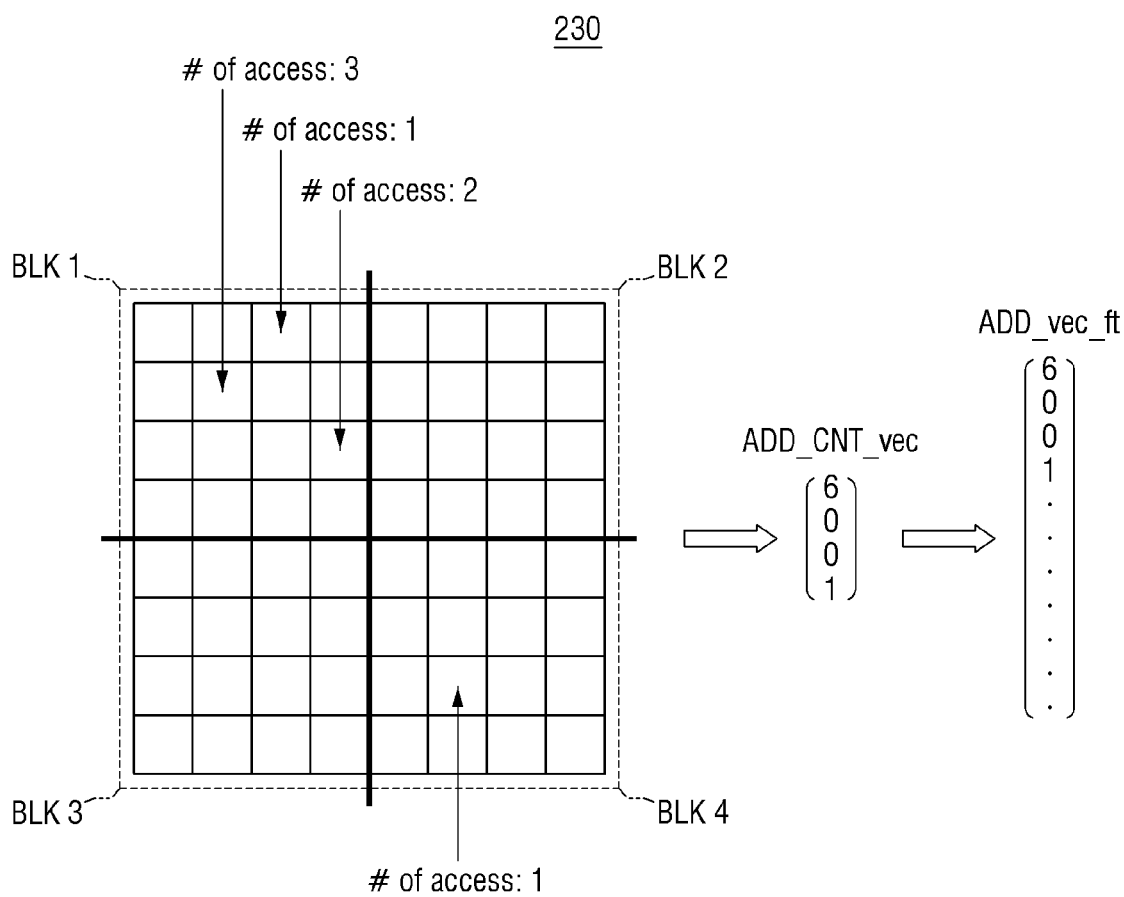
FIG. 9 is a diagram for explaining an operation of the address feature vector extractor.

FIG. 4 is an exemplary block diagram for explaining a memory device. FIG. 5 is an exemplary diagram for explaining banks of the memory device. FIG. 6 is an exemplary table for describing a workload sequence. FIGS. 7 and 8 are diagrams for explaining the operation of the command feature vector extractor. FIG. 9 is a diagram for explaining the operation of the address feature vector extractor.

Referring to FIGS. 3 to 6, the memory test device 10 according to an exemplary embodiment of the inventive concept includes a plurality of ranks 210 and 212. The plurality of ranks 210 and 212 are not limited to this drawing, and may be three or more.

Each of the plurality of ranks (e.g., rank 0) 210 includes a plurality of bank groups 220 and 222. The plurality of bank groups 220 and 222 are not limited to this drawing, and may be three or more.

Each of the plurality of bank groups 220 and 222 includes a plurality of banks (Bank 0 to Bank3). The number of banks included in each of the bank groups 220 and 222 is not limited to this drawing.

Each of the plurality of banks (Bank 0 to Bank 3) includes a plurality of memory cells. For example, a 0th bank 230 of a 0th bank group 220 of a 0th rank 210 may include a plurality of memory cells as in FIG. 5.

For example, a first memory cell (MC 1) among the plurality of memory cells included in the 0th bank 230 may be associated with a workload for the first memory cell (MC 1), as in FIG. 6. For example, the workload for each memory cell may be stored in the storage device 20 or in the test memory device 10.

The workload may include types of command and address-related information for the memory cell.

The command type CMD may include, for example, a state in which the memory cell is activated (ACT), a state in which a write operation is performed on the memory cell (WRITE), or a state in which a read operation is performed on the memory cell (READ).

For example, the command type for the first memory cell (MC 1) may be in the state (ACT) in which the first memory cell (MC 1) is activated, and the command type of the second memory cell (MC 2) may be in the state (WRITE) in which the write operation is performed on the second memory cell (MC 2).

The address-related information may include address information of the memory cell. For example, the address-related information may include a rank address (Rank) at which the memory cell is located, a bank group address (Bank Group) within the rank address, a bank address (Bank) within the bank group address, and an address address (Address) within the bank address.

For example, information may be stored on the test device 10 or the storage device 20 for the first memory cell (MC 1) that includes a location at the second address of the 0th bank of the bank group of the 0th rank, as the address-related information on the first memory cell (MC 1). As another example, the information may be for the second memory cell (MC 2) and include a location at the first address of the first bank of the 0th bank group of the 0th rank, as the address-related information on the second memory cell (MC 2).

A plurality of workloads for each of the plurality of memory cells are configured, and may form one workload sequence (Seq_WL) (e.g., a first workload sequence S1).

Referring to FIG. 7, the command field extractor 112 extracts the command on the basis of the workloads of the plurality of memory cells occurring in the memory device to be tested by the memory test device 10 according to an exemplary embodiment of the inventive concept.

The command field extractor 112 may specify the commands as different numbers depending on the types of commands for each of the plurality of memory cells. For example, "1" may be specified for a write (WRITE) command, and "2" may be specified for an activation (ACT) command. The format in which the command field extractor 112 specifies different numbers depending on the type of commands for each of the plurality of memory cells is not limited thereto.

The command field extractor 112 may divide the plurality of workload sequences S1, S2, S3, and S4 into arbitrary workload pools. For example, a first workload sequence S1 and a second workload sequence S2 are included in the first workload pool (WL pool 1), and a third workload sequence S3 and a fourth workload sequence S4 may be included in the second workload pool (WL pool 2).

The command field extractor 112 extracts information about the types of commands included in each of the plurality of workload sequences S1, S2, S3, and S4, and configure the command fields for each of the plurality of workload sequences S1, S2, S3, and S4.

For example, the command field extractor 112 may extract the command type of the first workload sequence S1, and configure the command fields included in the first workload sequence S1 as 1, 3, 5, 1, and 3. Also, the command field extractor 112 may extract the command type of the second workload sequence S2, and configure the command fields included in the second workload sequence S2 as 5, 1, 3, 5, and 5. Also, the command field extractor 112 may extract the command type of the third workload sequence S3, and configure the command fields included in the third workload sequence S3 as 1, 3, 5, 5, and 3. Also, the command field extractor 112 may extract the command type of the fourth workload sequence S4, and configure the command fields included in the fourth workload sequence S4 as 1, 1, 3, 5, and 5.

The operation of configuring the command field described above may be performed by the first extractor 114.

The first extractor 114 may extract the command feature vectors of the workload sequences included in each workload pool (e.g., the first workload pool (WL pool 1) and the second workload pool (WL pool 2)), using an n-gram model (where n is a natural number).

An example in which the first extractor 114 uses a Top-2 3-gram model will be described. The first extractor 114 may select the command pattern with the highest frequency of 2 among the command patterns for each of the workload sequences S1 and S2 in the first workload pool (WL pool 1). For example, the first extractor 114 may confirm that the pattern of the commands consecutively arranged in the first workload sequence S1 and the second workload sequence S2 is "1 3 5". In addition, the first extractor 114 may confirm that the pattern of the commands consecutively arranged in the first workload sequence S1 and the second workload sequence S2 is "5 1 3".

That is, the first extractor 114 generates information that the two command patterns "1 3 5" and "5 1 3" listed in each of the first workload sequence S1 and the second workload sequence S2 occur in the first workload pool (WL pool 1). As a result, information that "1 3 5" appear twice and "5 1 3" appear twice in the first workload pool (WL pool 1), such as (135, 2) and (513, 2) is generated. For example, the first extractor 114 may determine information indicating how often each unique sub-sequence occurs within a given workload pool. In an embodiment, a sub-sequence includes at least two numbers, and the numbers need not be unique.

Also, the first extractor 114 may generate information such as (351, 1) and (355, 1), on the basis of information that "3 5 1" appear once in the first workload sequence S1 and "3 5 5" appear once in the second workload sequence S2.

Similarly, an example in which the first extractor 114 uses a Top-2 3-gram model will be described. The first extractor 114 may select the command pattern with the highest frequency of 2 among the command patterns for each of the workload sequences S3 and S4 in the second workload pool (WL pool 2). For example, the first extractor 114 may confirm that the pattern of the commands consecutively arranged in the third workload sequence S3 and the fourth workload sequence S4 is "1 3 5". In addition, the first extractor 114 may confirm that the pattern of commands consecutively arranged in the third workload sequence S3 and the fourth workload sequence S4 is "3 5 5".

That is, the first extractor 114 generates information that two command patterns "1 3 5" and "3 5 5" listed in each of the third workload sequence S3 and the fourth workload sequence S4 occur in the second workload pool (WL pool 2). As a result, information that "1 3 5" appear twice and "3 5 5" appear twice in the second workload pool (WL pool 2), such as (135, 2) and (355, 2) is generated.

Also, the first extractor 114 may generate information such as (553, 1) and (113, 1), on the basis of information that "5 5 3" occur once in the third workload sequence S3, and "1 1 3" occur once in the fourth workload sequence S4.

Referring to FIG. 8, a command feature vector (CMD_vec_ft) may be generated on the basis of information generated by the first extractor 114.

An example in which the first extractor 114 uses the Top-2 3-gram model will be described. The command feature vectors for the plurality of workload sequences are extracted, using only information about three patterns of commands ("1 3 5", "5 1 3", and "3 5 5") having the frequency of 2, among the information generated in FIG. 7. A pattern of command may refer to a unique sequence of commands, such as activate→read→write; write→activate→read; read→write→write; etc.

For example, the command feature vector (CMD_vec_ft) includes a matrix vector which may represent that the command pattern "1 3 5" occurred once, "5 1 3" occurred once, and "3 5 5" never occurred or occurred 0 times for the first workload sequence S1. In addition, the command feature vector (CMD_vec_ft) includes a matrix vector which may represent that the command pattern "1 3 5" occurred once, "5 1 3" occurred once, and "3 5 5" occurred 0 times for the second workload sequence S2. In addition, the command feature vector (CMD_vec_ft) includes a matrix vector which may represent that the command pattern "1 3 5" occurred once, "5 1 3" occurred 0 times, and "3 5 5" occurred once for the third workload sequence S3. In addition, the command feature vector (CMD_vec_ft) includes a matrix vector which may represent that the command pattern "1 3 5" occurred once, "5 1 3" occurred 0 times, and "3 5 5" occurred once for the fourth workload sequence S4.

Next, the operation of the address feature vector extractor 120 of FIG. 3 will be described.

Referring to FIG. 3 again, the address feature vector extractor 120 includes an address field extractor 122 (e.g., a logic circuit or program) and a second extractor 124 (e.g., a logic circuit or program).

The address field extractor 122 may extract address-related information about a plurality of memory cells included in the memory device tested by the memory test device 10 according to an exemplary embodiment of the inventive concept.

The second extractor 124 may extract the address feature vector (ADD_vec_ft) on the basis of the address-related information extracted by the address field extractor 122.

More specifically, the second extractor 124 may extract rank fields for the plurality of ranks 210 and 212 described in FIGS. 4 to 6, extract bank group fields for the plurality of bank groups 220 and 222, and extract the bank fields for the plurality of banks (bank 0 to bank 3). The rank fields, the bank group fields, and the bank fields described above are not limited thereto, and may be extracted from the address field extractor 122.

That is, the second extractor 124 may generate the address feature vector (ADD_vec_ft), using various types of address-related information extracted through the address field extractor 122 together, on the basis of the extracted rank fields, bank group fields, and bank fields.

The operation thereof will be described in detail through FIG. 9.

Referring to FIG. 9, the address field extractor 122 may extract feature vectors for the rank fields, the bank group fields, and the bank fields, and extract feature vectors for the address field separately.

The feature vectors for the rank fields, the bank group fields, and the bank fields may be extracted through the second extractor 124, but embodiments of the inventive concept are not limited thereto.

The second extractor 124 may then divide the plurality of memory cells into a plurality of blocks BLK1, BLK2, BLK3, and BLK4. The size of dividing the plurality of memory cells into the plurality of blocks BLK1, BLK2, BLK3, and BLK4 is not limited to this drawing and may be arbitrary.

The second extractor 124 may generate an address count vector (ADD_CNT_vec) on the basis of the number of times accessed for each of the plurality of blocks BLK1, BLK2, BLK3, and BLK4. For example, the second extractor 124 may determine that access to one cell among the memory cells included in the first block BLK1 occurred three times, access to the other cell occurred once, and access to the other cell occurred twice, and determine that access to the first block BLK1 was performed a total of six times.

It may be determined that no accesses to the second block BLK2 occurred and no accesses to the third block BLK3 occurred.

After that, it is determined that one access occurred for one of the memory cells included in the fourth block BLK4.

Therefore, the second extractor 124 generates the address count vector (ADD_CNT_vec). The address count vector (ADD_CNT_vec) may indicate the number of accesses that occurred in each of the blocks of a given memory bank being monitored.

On the basis of this, the second extractor 124 may gather the bank count vector generated on the basis of the number of times of access to independent banks included in the memory device, and the address count vector (ADD_CNT_vec) generated on the basis of the number of times of access to the plurality of memory cells included in the memory device to generate the address feature vector (ADD_vec_ft) for all the memory cells of the memory device. For example, the address count vector (ADD_CNT_vec) may be generated for each of the banks and summed up for all banks to generate the address feature vector (ADD_vec_ft).

The address field extractor 122 according to some embodiments may, for example, extract feature vectors for each of the ranks 210 and 212 shown in FIG. 4, the bank groups 220 and 222 included in each of the ranks 210 and 212, and banks (Bank0, Bank1, Bank2, and Bank3) included in each of the bank groups 220 and 222.

That is, the bank count vector may be generated, by counting the number of times of access to each of a total 2×2×4=16 access routes of the two ranks 210 and 212, the two bank groups 220 and 222 included in each of the ranks 210 and 212, and the four banks (Bank 0, Bank 1, Bank 2, and Bank 3) included in each of the bank groups 220 and 222.

Referring to FIG. 2 again, the command feature vector (CMD_vec_ft) and the address feature vector (ADD_vec_ft) generated through the feature vector extractor 100 are sent to the class detector 130. The class detector 130 may classify whether the feature vectors corresponds to a known class or an unknown class, on the basis of the command feature vector (CMD_vec_ft) and the address feature vector (ADD_vec_ft) received through the feature vector extractor 100.

The configuration and operation of the class detector 130 will be described in detail below.

Figure 10:
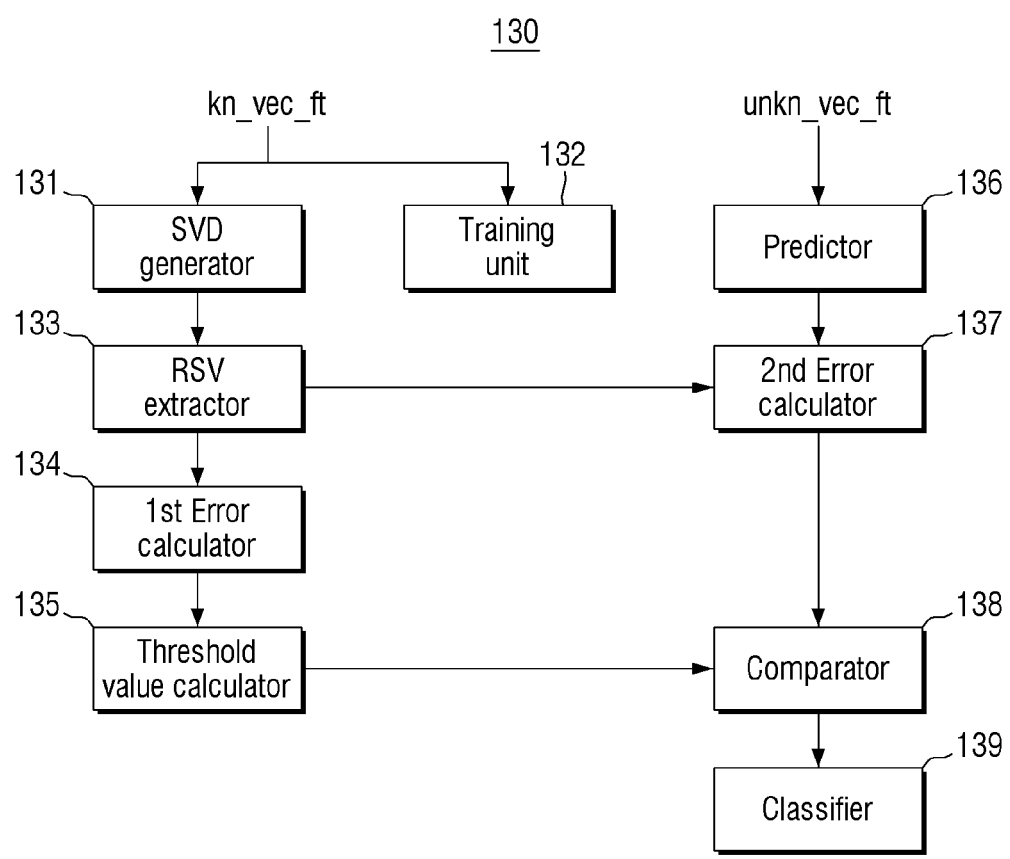
FIG. 10 is a block diagram for explaining a class detector.

FIG. 10 is a block diagram for explaining the class detector.

The class detector 130 includes a Singular Value Decomposition (SVD) generator 131 that receives the learning feature vector (kn_vec_ft), and a training unit 132 (e.g., a logic circuit or program). Additionally, the class detector 130 includes a predictor 136 (e.g., a logic circuit or program) that receives the test feature vector (unkn_vec_ft).

The command feature vector (CMD_vec_ft) and the address feature vector (ADD_vec_ft) as described above are commonly called the feature vector (vec_ft) for reference.

The SVD generator 131 receives the learning feature vector (kn_vec_ft) and performs the singular value decomposition on the basis of the received learning feature vector (kn_vec_ft).

For example, the learning feature vector (kn_vec_ft) is assumed to be an element of the real number set as in Formula 1.

$$X_w \in \mathbb{R}^{N_w \times F} \quad \text{Formula 1}$$

In Formula 1, w refers to a specific class, $X_w$ is a set matrix of the learning feature vectors (kn_vec_ft) of the class w, Nw is the number of feature vectors (kn_vec_ft) of the class w, and F is a size of the feature vector (kn_vec_ft) of each workload.

After that, the SVD generator 131 performs the singular value decomposition on the set matrix of the learning feature vector (kn_vec_ft) as shown in Formula 2.

$$X_w = U_w \Sigma_w V_w^T \quad \text{Formula 2}$$

$U_w$ is a left-singular vector matrix, $V_w$ is a right singular vector matrix (RSV), and $\Sigma_w$ is a diagonal matrix in which a diagonal element is not a negative number.

The class detector 130 includes a right singular vector (RSV) extractor 133.

The RSV extractor 133 extracts right singular vectors on the basis of the singular value decomposition performed through the SVD generator 131.

The right singular vector may be an element of the real set for the feature vector according to each workload, as shown in Formula 3 below.

$$V_w \in \mathbb{R}^{F \times R_w} \quad \text{Formula 3}$$

$V_w$ is the right singular vector matrix extracted through the RSV extractor 133, and Rw is a value utilized for approximation in the singular value decomposition calculation, which may be a target rank.

The class detector 130 includes a first error calculator 134 (e.g., a logic circuit or program).

The first error calculator 134 calculates a first reconstruction error through Formula 4 below.

$$\text{First reconstruction error} = \|x_w - V_w V_w^T x_w\|_2 \qquad \text{Formula 4}$$

The first reconstruction error may be calculated through Euclidean distance as in Formula 4 through the first error calculator 134. T is a symbol that represents a transposed matrix. The class detector 130 includes a threshold value calculator 135.

The threshold value calculator 135 obtains a threshold value through Formula 5 below.

$$\epsilon_w = \mu_w + \alpha^* \sigma_w \qquad \text{Formula 5}$$

$\epsilon_w$ is a threshold value calculated on the basis of the first reconstruction error calculated through the first error calculator 134. $\mu_w$ is a mean value of the first reconstruction errors calculated through the first error calculator 134. $\alpha$ is a weighted value. For example, the weighted value may have a value of 1 or more and 3 or less. $\sigma_w$ is a standard deviation value of the first reconstruction errors calculated through the first error calculator 134.

The training unit 132 may perform the machine learning on the basis of the learning feature vector (kn_vec_ft). The machine learning may be performed, for example, through a Multi Layer Perceptron (MLP), but the machine learning performed by the training unit 132 is not limited thereto.

The predictor 136 receives the test feature vector (unkn_vec_ft) and the learning result learned through the training unit 132.

The test feature vector (unkn_vec_ft) received by the predictor 136 may be as in Formula 6 below.

$$x' \in \mathbb{R}^F \qquad \text{Formula 6}$$

x' is the test feature vector (unkn_vec_ft), which may be an element of the set of feature vectors (vec_ft).

The prediction unit 136 predicts the test feature vector (unkn_vec_ft) as being a specific class on the basis of the results learned through the training unit 132.

For example, the predictor 136 predicts the test feature vector (unkn_vec_ft) to be the class labeled as ŵ. That is, the class detector 130 performs work that predicts the test feature vector (unkn_vec_ft) as some class, classifies the test feature vector (unkn_vec_ft) as being the predicted class if the prediction is correct, and classifies the test feature vector (unkn_vec_ft) as being a new class otherwise. This will be described in detail below.

The class detector 130 includes a second error calculator 137 (e.g., a logic circuit or a program). The second error calculator 137 receives the right singular vector extracted through the RSV extractor 133 and calculates a second reconstruction error. That is, the class detector 130 may perform a class classifying work on the test feature vector (unkn_vec_ft), using the second reconstruction error calculated by the second error calculator 137.

The second error calculator 137 may obtain a second reconstruction error on the basis of Formula 7.

$$\|x' - V_{\hat{w}} V_{\hat{w}}^T x'\|_2 \qquad \text{Formula 7}$$

The class detector 130 includes a comparator 138 (e.g., a comparator circuit or a program). The comparator 138 compares the second reconstruction error calculated through the second error calculator 137 with the threshold value calculated through the threshold value calculator 135 and classifies the test feature vector (unkn_vec_ft) predicted through the predictor 136.

More specifically, the comparator 138 performs a comparison on the basis of Formula 8 below.

$$\|x' - V_{\hat{w}} V_{\hat{w}}^T x'\|_2 < \epsilon_w \qquad \text{Formula 8}$$

The comparator 138 determines whether the second reconstruction error calculated through the second error calculator 137 is smaller than the threshold value generated through the threshold value calculator 135, and sends the determined result to the classifier 139.

The classifier 139 (e.g., a logic circuit or a program) performs the class classification on the test feature vector (unkn_vec_ft) on the basis of the results compared through the comparator 138.

For example, if the second reconstruction error calculated through the second error calculator 137 is determined to be smaller than the threshold value as a result of comparison performed through the comparator 138, the classifier 139 determines that the prediction of the predictor 136 is correct, and classifies the class for the test feature vector (unkn_vec_ft) as the class predicted by the predictor 136.

Otherwise, if the second reconstruction error calculated through the second error calculator 137 is determined not to be smaller than the threshold value as a result of comparison performed through the comparator 138, the classifier 139 determines that the prediction of the predictor 136 is wrong, and classifies the class of the test feature vector (unkn_vec_ft) as a new class.

The operation of the class detector 130 will be described in detail below on the basis of flowcharts. In order to simplify the explanation, repeated explanation of contents explained above through FIG. 10 will not be provided.

Figure 11:
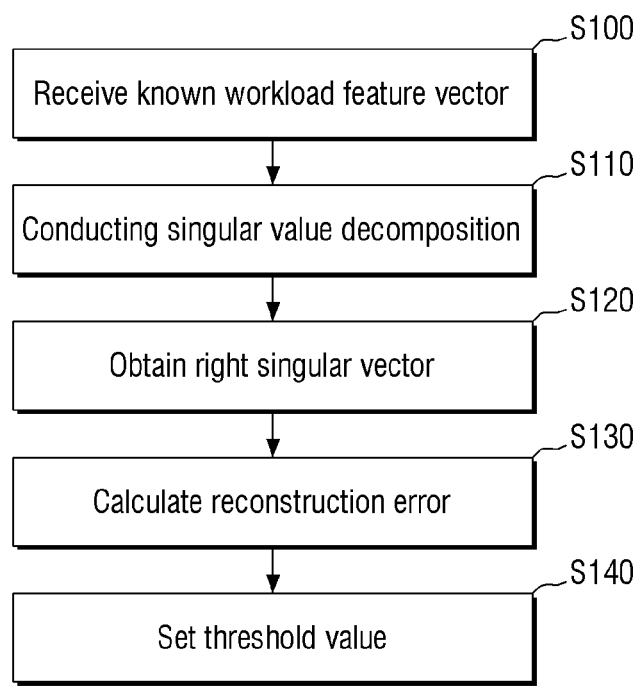
FIG. 11 is a flowchart for explaining an operation of a class detector that receives known feature vectors.

FIG. 11 is a flowchart for explaining the operation of a class detector that receives known feature vectors.

Referring to FIGS. 10 and 11, the class detector 130 receives the learning feature vector (kn_vec_ft) through a Singular Value Decomposition (SVD) generator 131 and a training unit 132 (S100).

Thereafter, the singular value decomposition is performed through the SVD generator 131 on the basis of the received learning feature vector (kn_vec_ft) (S110).

After that, the right singular vector is extracted through the RSV extractor 133 on the basis of the singular value decomposition performed through the SVD generator 131 (S120).

After that, the first reconstruction error is calculated through the first error calculator 134 (S130).

After that, a threshold value is calculated through the threshold value calculator 135 (S140).

Figure 12:
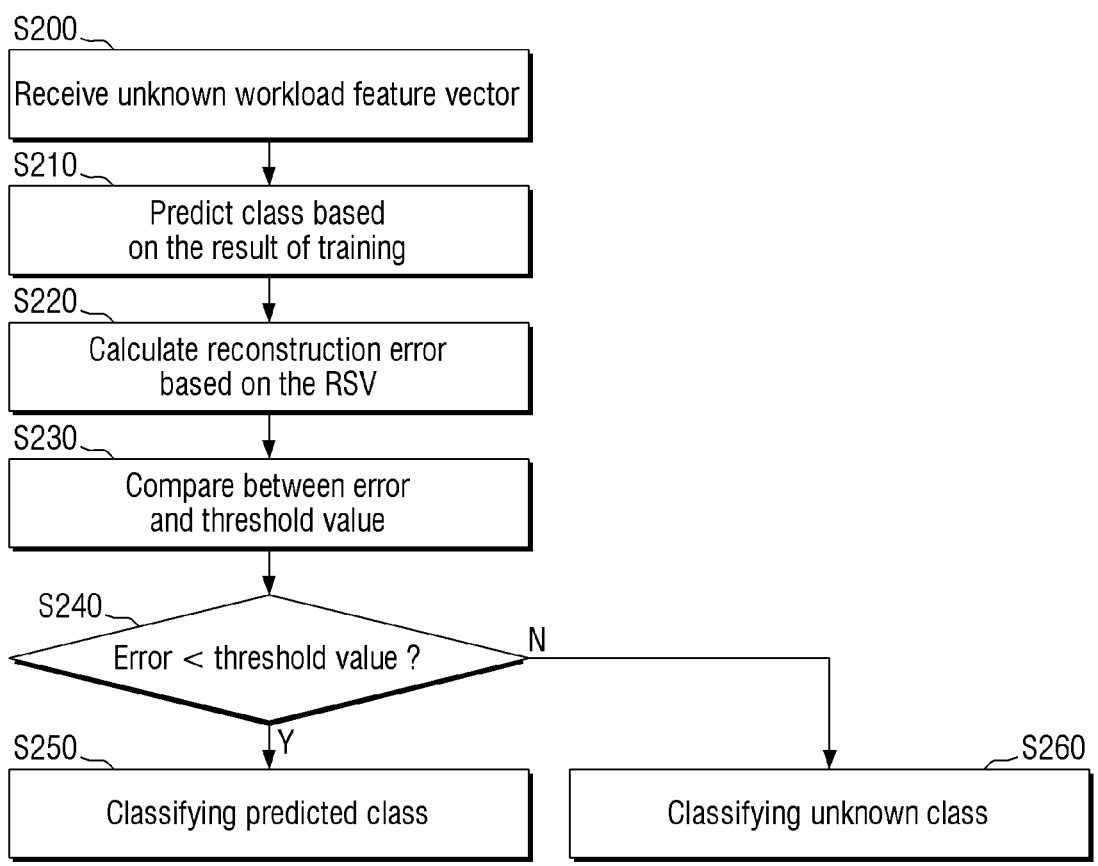
FIG. 12 is a flow chart for explaining an operation of a class detector that receives an unknown feature vector.

FIG. 12 is a flow chart for explaining the operation of a class detector that receives an unknown feature vector.

Referring to FIGS. 10 and 12, the class detector 130 receives the test feature vector (unkn_vec_ft) through the predictor 136 (S200).

After that, the prediction unit 136 predicts the class of the received test feature vector (unkn_vec_ft), on the basis of the learning result learned through the training unit 132 (S210).

After that, the second error calculator 137 receives the right singular vector extracted through the RSV extractor 133 to calculate a second reconstruction error (S220).

After that, the comparator 138 compares the second reconstruction error calculated through the second error calculator 137 with the threshold value generated through the threshold value calculator 135 (S230). The result of the compare may indicate whether the second reconstruction error is smaller than a threshold value.

In an embodiment, the classifier 139 performs class classification on the test feature vector (unkn_vec_ft), on the basis of the result compared through the comparator 138.

For example, the classifier 139 determines whether the second reconstruction error calculated through the second error calculator 137 is smaller than the threshold value, as a result compared through the comparator 138 (S240). For example, the classifier 139 determines whether the second reconstruction error is smaller than the threshold value using the result output by the comparator 138.

If the second reconstruction error calculated through the second error calculator 137 is determined to be smaller than the threshold value (Y) as a result compared through the comparator 138, the classifier 139 determines that prediction of the predictor 136 is correct, and classifies the class of the test feature vector (unkn_vec_ft) as a class predicted by the predictor 136 (S250). For example, if the predictor 136 is configured to classify a feature vector as one of a plurality of available classes and the second reconstruction error is determined to be smaller than the threshold value for a given test feature vector, the classifier 139 selects one of available classes as the class for the given test feature vector.

Otherwise, if the second reconstruction error calculated through the second error calculator 137 is determined not to be smaller than the threshold value (N) as a result compared through the comparator 138, the classifier 139 determine that the prediction of the predictor 136 is wrong, and classifies the class of the test feature vector (unkn_vec_ft) as a new or unknown class (S260). In an embodiment, a memory device such as that shown in FIG. 4 avoids the sequence of operations of the test feature vector or the sequence of operations of the available classes. For example, if the system learns that a pattern of writing, reading and then writing again to a first memory cell is likely to cause an error, the memory device can be instructed to avoid this pattern. For example, the memory device could write a second memory cell instead of writing the first memory cell after writing and reading the first memory cell.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A memory test device comprising:
a command feature vector extractor that extracts a command feature vector, based on commands executed on memory cells among a plurality of memory cells of a memory device;
an address feature vector extractor that extracts an address feature vector, based on address-related information indicating locations of the memory cells executing the commands; and
a class detector configured to analyze the command feature vector and the address feature vector to identify patterns of operation that cause a failure or defect in the memory device.

2. The memory test device of claim 1, wherein the command feature vector extractor includes:
a command field extractor that extracts the commands executed on each of the plurality of memory cells, and
a first extractor that extracts the command feature vector based on the commands extracted through the command field extractor.

3. The memory test device of claim 2, wherein the first extractor assigns unique numeric identifiers to each distinct command type extracted by the command field extractor to the generate the command feature vector, where each of the numeric identifiers corresponds to one type of command executed on the memory cells.

4. The memory test device of claim 2, wherein the first extractor extracts the command feature vector, using an n-gram model and n is a natural number.

5. The memory test device of claim 4, wherein the first extractor extracts a sequence of the commands occurring at least m times for the command feature vector, where m is a natural number.

6. The memory test device of claim 1, wherein the address feature vector extractor includes:
an address field extractor that extracts the address-related information associated with the plurality of memory cells, and
a second extractor that extracts the address feature vector based on the address-related information extracted through the address field extractor.

7. The memory test device of claim 6, wherein the address-related information includes a rank addresses, a bank group address inside the rank address, a bank address inside the bank group address, and an address inside the bank address.

8. The memory test device of claim 7, wherein the address field extractor defines the rank address, the bank group address, the bank address and the address address as one number.

9. The memory test device of claim 6, wherein the second extractor divides the plurality of memory cells into a plurality of blocks, and generates an address count vector for each of the plurality of blocks, based on a result of counting the number of times of accesses to each of the plurality of blocks.

10. The memory test device of claim 9, wherein the second extractor extracts the address feature vector based on the address count vector.

11. A memory test device comprising:
a class detector that divides workloads of a plurality of memory cells into a known workload and an unknown workload, based on a reconstruction error calculated using right singular vector (RSV) derived from a singular value decomposition performed on a feature vector generated from a workload sequence associated with the known workload,
wherein the workload sequence includes commands executed on memory cells among the plurality of memory cells and address-related information indicating locations of the memory cells executing the commands.

12. The memory test device of claim 11, wherein the feature vector comprises:
a command feature vector generated based on the commands of the workload sequence, and
an address feature vector generated based on the address-related information of the workload sequence.

13. The memory test device of claim 12, wherein the address-related information comprises a rank addresses, a bank group address inside the rank address, a bank address inside the bank group addresses, and an address inside the bank address.

14. The memory test device of claim 11, wherein the class detector comprises:
- a singular value decomposition (SVD) generator that receives a learning feature vector and performs a singular value decomposition (SVD) on the learning feature vector, and
- a training unit that performs class classification learning based on the learning feature vector.

15. The memory test device of claim 14, wherein the class detector includes a predictor that receives a test feature vector, and predicts a class of the test feature vector based on a class classification learning result generated through the training unit.

16. The memory test device of claim 15, wherein the class detector comprises:
- a right singular vector (RSV) extractor that extracts the right singular vector (RSV) based on a singular value decomposition performed through the SVD generator,
- a first error calculator that calculates a first reconstruction error based on a right singular vector value extracted through the RSV extractor, and
- a threshold value calculator that generates a threshold value based on the first reconstruction error.

17. The memory test device of claim 15, wherein the class detector comprises:
- a second error calculator that calculates a second reconstruction error between the right singular vector (RSV) extracted based on a singular value decomposition value generated through the SVD generator and a class predicted through the predictor,
- a comparator that compares a threshold value calculated based on a first reconstruction error calculated through the right singular vector (RSV) with the second reconstruction error to generate a result, and
- a classifier that classifies the test feature vector based on the result.

18. A memory test device comprising:
- a feature vector extractor that includes a command feature vector extractor configured to extract a command feature vector based on commands executed by memory cells among a plurality of memory cells, and an address feature vector extractor configured to extract an address feature vector based on address-related information of the memory cells accessed by the commands; and
- a class detector that classifies workloads of the memory cells into a known workload and an unknown workload, based on a reconstruction error calculated using a right singular vector (RSV) derived from a singular value decomposition performed on a feature vector including the command feature vector and the address feature vector.

19. The memory test device of claim 18, wherein the command feature vector extractor includes a command field extractor that extracts the commands executed by the memory cells, and a first extractor that extracts the command feature vector, based on the commands extracted through the command field extractor, and the address feature vector extractor includes an address field extractor that extracts the address-related information of the memory cells, and a second extractor that extracts the address feature vector, based on the address-related information.

20. The memory test device of claim 19, wherein the class detector comprises:
- a singular value decomposition (SVD) generator that receives a learning feature vector and performs a singular value decomposition (SVD) on the learning feature vector,
- a training unit that performs class classification learning based on the learning feature vector,
- a predictor that receives a test feature vector, and predicts a class of the test feature vector, based on a class classification learning result generated through the training unit,
- a right singular vector (RSV) extractor that extracts the right singular vector (RSV), based on a singular value decomposition (SVD) value generated through the SVD generator,
- a first error calculator that calculates a first reconstruction error, based on a right singular vector value extracted through the RSV extractor,
- a threshold value calculator that generates a threshold value, based on the first reconstruction error, a second error calculator that calculates a second reconstruction error between the right singular vector value and the class predicted through the predictor,
- a comparator that compares the threshold value with the second reconstruction error to generate a result, and
- a classifier that classifies the test feature vector, based on the basis of the result.

* * * * *